E. KATZINGER.
CASTER HOLDER.
APPLICATION FILED SEPT. 25, 1911.
1,064,340.
Patented June 10, 1913.
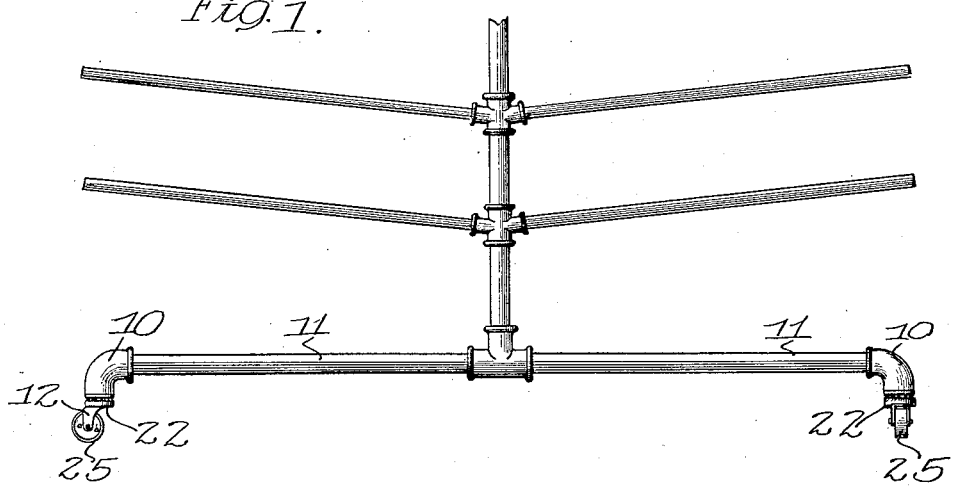
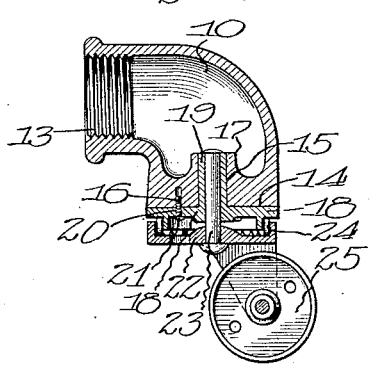
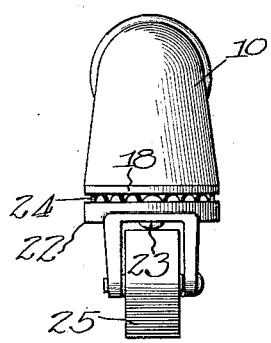
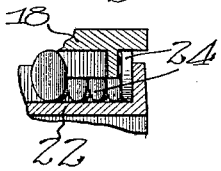
Witnesses:
G. W. Dumarus Jr.
R. Burkhardt.
Inventor:
Edward Katzinger
By: Brown & Hopkins
Attys

UNITED STATES PATENT OFFICE.

EDWARD KATZINGER, OF CHICAGO, ILLINOIS.

CASTER-HOLDER.

1,064,340.

Specification of Letters Patent.

Patented June 10, 1913.

Application filed September 25, 1911. Serial No. 651,078.

*To all whom it may concern:*

Be it known that I, EDWARD KATZINGER, a citizen of the United States, residing at Chicago, in the county of Cook and State of Illinois, have invented certain new and useful Improvements in Caster-Holders, of which the following is a specification.

This invention relates to a caster holder, more particularly described as a device of the class referred to and employed in connection with a rack truck, and the principal object of the invention is to provide a simple, strong and cheap device of the class described which is effective and efficient in operation.

For the attainment of these ends and the accomplishment of other new and useful objects, the invention consists in the features of novelty in the construction, combination and arrangement of the holder generally shown in the accompanying drawing and described in the specification, but more particularly pointed out in the appended claims.

In the drawing, Figure 1 is a view of a caster holder constructed in accordance with the principles of my invention as used in conjunction with a pan rack. Fig. 2 is a sectional view of the holder with a caster in position. Fig. 3 is a view in elevation of the same. Fig. 4 is a view in detail of the caster.

In employing a caster for very heavy articles, it is difficult to provide means for securely mounting the caster. This is particularly true of apparatus in which the means for supporting the caster must be secured in a lateral direction. In practice, if the caster is secured to the holder by screws alone, the continual movement of the apparatus works the screws loose and allows the caster to become disengaged from the holder. If the caster is pressed in position through an opening, the continual movement of the apparatus upon the caster in time works the connection and the caster loose. In the present invention, the applicant presents a structure which is adapted to be secured in a lateral direction, and to present means for securely holding a caster in the proper position.

Referring more particularly to the drawing, a holder 10 is exemplified in connection with the rack-holder or base portion 11 which is preferably constructed of tubular members and upon which the caster-holders 10 may be threaded. Positioned in the holders are casters 12 of any suitable construction, the preferred form of which will be presently described.

The construction of the holder 10 is shown more clearly in the detail view. From this view it will be seen that the holder is formed with faces disposed at an angle to each other, which may be referred to as an L shape. One of the ends of the holder is formed with an internally threaded opening 13, in which a correspondingly threaded member is adapted to engage to position the holder. The other end of the holder is formed with a flat face 14 in which there is a opening 15, preferably adjacent the center thereof and threaded openings 16. This end of the holder is preferably of a thick, solid construction to present a substantial abutting face for the caster. The opening 15 preferably extends through the thickened portion and is provided with extending edges 17 which surround the opening on the inside.

A caster of any desired or suitable construction may be employed in connection with this holder, such for example, as shown by Fig. 2, in which a face plate 18 is provided with a projection 19 which is adapted to be inserted in the opening 15 of the holder. This projection 19 fits tightly within the holder and preferably must be pressed into position. As an additional means for securing the caster to the holder, openings 20 are provided in the face plate corresponding with the threaded openings 16 in the holder, in which screws 21 may be inserted to secure the face plate firmly to the holder. It has been found in practice, that if the caster is secured to a holder by means of the screws alone, they quickly become loose, and if secured to a holder by means of a tight-fitting projection alone, the caster soon becomes loose, but if both fastening devices are used in connection with the same holder, the one aids the other in maintaining the caster in position and a firm connection is made. This construction is particularly adapted for the caster shown, by reason of the fact that a base member 22 is secured to the face plate 18 by means of a bolt 23 extending through them both, the bolt also extending through the projection 19 of the face plate, but permitting the rotation of the base member 22 with respect to the face plate. The construction of the base 22 and the face plate is such that an annular space is provided formed between the two, which provides means supporting the disks or rollers 24. These rollers extend entirely around the base member 22 and are adapted to equalize the wear upon the members. The base member 22 also supports a roller 25 in any suitable well known manner.

One of the chief advantages of this holder is that it presents an absolutely rigid and suitable support for a caster when used in connection with an apparatus constructed of tubing, and the like. In this connection it will be noted that the connection with the holder is lateral, considered with respect to the face which supports the caster, thereby constituting a very compact and uniform construction, in keeping with the remainder of the apparatus. In the exemplification of the invention shown by Fig. 1, it will be seen that the racks as well as the trucks or base 11, is constructed of tubes, and it is to this construction that this holder is particularly adapted.

What I claim is:

1. The combination of a base of tubular construction, and a caster holder having a threaded end for connection thereto and with a caster holding face disposed at an angle to the threaded end and provided with an opening to receive a vertical projection of a caster and with threaded openings to receive fastening screws, the caster projection fitting tightly in the said opening, and the screws aiding the securing function.

2. The combination with a truck of pipe construction of an L shaped caster holder having a threaded opening at one end to receive a pipe, and a flat face at the other end with a central opening and smaller threaded openings, and a caster having an upper fixed face plate with a central projection to fit the said central opening tightly, and other openings corresponding with the threaded openings, through which screws are inserted to secure the caster to the holder.

In testimony whereof I have signed my name to this specification, in the presence of two subscribing witnesses, on this 22nd day of September A. D. 1911.

EDWARD KATZINGER.

Witnesses:
CHARLES H. SEEM,
FRANCIS A. HOPKINS.

---

Copies of this patent may be obtained for five cents each, by addressing the "Commissioner of Patents, Washington, D. C."